Dec. 6, 1960     H. J. SMILE ET AL     2,963,268
PRESSURIZED SEAL
Filed March 25, 1957
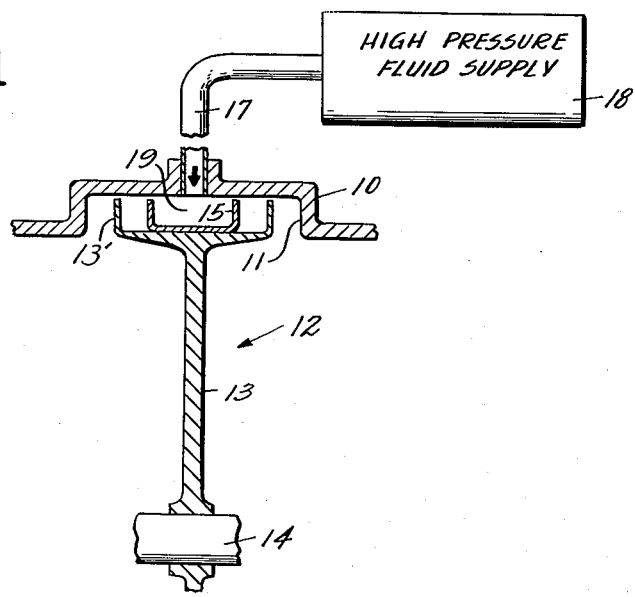
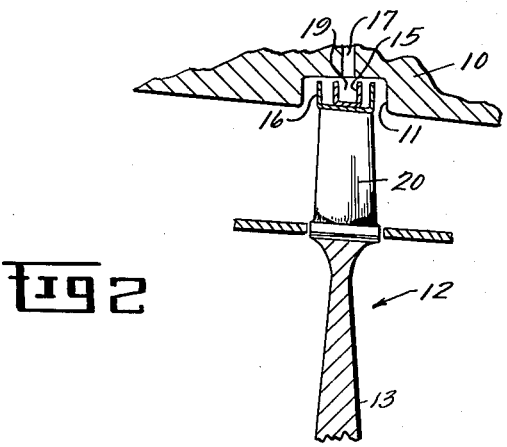
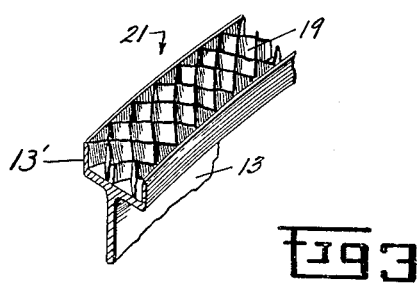
INVENTORS.
HAMAD J. SMILE
BY ELMIR E. PAULSON
John F. Cullen
ATTORNEY

United States Patent Office 2,963,268
Patented Dec. 6, 1960

2,963,268
PRESSURIZED SEAL

Hamad Jasper Smile, Reading, and Elmir E. Paulson, Madeira, Ohio, assignors to General Electric Company, a corporation of New York Filed Mar. 25, 1957, Ser. No. 648,088

6 Claims. (Cl. 253—39)

This invention relates to a pressurized seal and, more particularly, to a pressurized chamber-like structure between a rotating and stationary element which may form a pressurized seal and/or an air bearing.

In high speed rotating machinery such as may be found in jet engine application, clearances between the rotating and stationary parts must be maintained at a minimum and effective seals between the two are necessary if losses are to be avoided and operating efficiency is to be maintained as high as possible. The seals which are necessary at the extremities of the rotating parts are subjected to high centrifugal forces which vary directly as the distance from the center of rotation increases. Many elaborate sealing arrangements have been proposed for such applications and have proved satisfactory for many types of equipment. However, as the speed of rotation is increased and thus the centrifugal force on the rotating member is increased, many of these sealing structures are ineffective to perform their function due to the extremely high stresses to which they are exposed. Thus, in order to make these structures withstand the stresses, it is necessary to strengthen them by adding to the weight of the parts which addition is undesirable in light weight application such as may be found in an aircraft power plant.

As the main object of the present invention there is disclosed a sealing arrangement that is independent of the centrifugal forces since, by the structure disclosed, the forces are balanced or cancelled out.

A further object of the invention is to utilize any high pressure fluid, such as air or exhaust gases, which is normally available in sufficient quantities, such as in a jet engine, to satisfy the requirements of the present invention.

Another object of the present invention is to disclose such a structure which is extremely light weight and yet may serve a dual purpose of a pressurized seal and/or an air bearing.

Briefly stated, in accordance with one aspect of our invention we employ a compartmented element such as channel-like members on the periphery of the rotating member, which may be a disk, which compartmented element or channel members are wider than the disk and open outwardly into a recessed portion in the stationary member and extend into close proximity to the stationary member but are not in contact therewith. Means is provided, preferably in the stationary member, to supply high pressure fluid, such as air, to the compartmented element to form a pressure chamber between the rotating and stationary members. Because of the compartment structure, a sufficient area is provided which, when multiplied by the supply pressure, gives a force that is sufficient to cancel or balance the centrifugal force on the rotating member and, at the same time, provide an effective seal and/or air bearing.

Our invention will be better understood from the following description taken in connection with the accompanying drawing in which;

Fig. 1 is a partial cross sectional view disclosing the principle of our invention and;

Fig. 2 is a similar partial cross sectional view showing a species of the invention as it would be applied to a turbine or compressor and;

Fig. 3 is a partial perspective view showing an alternate compartmented structure.

Referring first to Fig. 1 there is shown a casing 10 which may be the casing of a turbine or compressor or any suitable stationary member of light-weight rotating machinery to which the invention may be applied. Casing 10 preferably has a recessed portion 11 formed therein in the general shape of an annulus to accommodate a rotating member. While an annulus has been shown it is to be understood that it is not necessary that an annulus be supplied nor that it be supplied in the particular shape shown although such showing is a preferred execution.

To cooperate with the stationary member, there is provided a rotating member generally indicated at 12 which may comprise a disk 13 mounted on a shaft 14 for rotation therewith. Normally, the present invention is associated with a high speed rotating member 12 although it is not essential that it be so. Such high speed rotation is of the type that may generally be found in the rotating members of the principal elements in a gas turbine powerplant such as a jet engine. The high speed rotation of member 12 subjects its peripheral portion to high centrifugal forces. In order to counteract these forces, there is provided on the periphery of member 12 an outwardly directed and peripherally extending compartment-forming member such as sheet metal channel 15 which is wider than disk 13 and which may be nested within one or more additional channels 13' of similar configuration wider than disk 13. The channel members 15 and 13' extend into the recess 11 into close proximity therewith although maintaining a clearance therewith. Because of the cancelling force to be applied, as will hereinafter be apparent, channel 15 may be made of extremely light weight thin sheet metal stock and may be suitably secured by any conventional means such as welding to disk 13. Channel members 15 and 13' may have any suitable wider axial distance across disk 13 depending upon the centrifugal force on rotating member 12 that must be counterbalanced.

In order to counterbalance the centrifugal forces on rotating members 12, a fluid supply means which may consist of a port 17 is provided in either the stationary or rotating member and preferably in casing 10 centrally of the compartmented element or channel members 15 and 13' and the recessed portion 11. Supply means 17 may be fed from any suitable high pressure fluid supply 18 which, in a jet engine application, may be the standard axial compressor if such compressor is employed or a source of exhaust gases as typical.

The operation of the above described device will be apparent in the drawing taken in connection with the description. A high pressure fluid supply, such as air, is directed through supply means 17 to the compartmented element to form a pressure chamber 19 between the outwardly opening channels 15 and 13' and recess 11. Depending upon the cross sectional area of the channels, it will be apparent that the force developed may be conveniently made sufficient to balance and with the wheel and hoop forces cancel the centrifugal forces exterted on relatively thin rotating member 12 by the rotation imparted thereto. Thus a very effective seal is provided to prevent the passage of fluid from one side of member 12 to the other. In addition, if sufficient high pressure air is supplied, the compartmented element providing pressure chamber 19 may be sufficiently charged to provide an air bearing to dispense with the normal bearing that would be required to support shaft 14.

Referring next to Fig. 2, wherein like numerals refer to like parts, we have shown the application of the invention to a typical turbine or compressor rotor. In this case, the rotating member 12 may form the rotor element of the compressor or turbine. Rotating blades 20 have the compartmented element in the form of channel members 15 and 16 secured to the outer periphery thereof similar to a shroud construction. It will be apparent that the operation of this particular embodiment is identical with that of Fig. 1.

An alternate compartmented element, such as shown in Fig. 3, may be employed in lieu of the channels. This may comprise a cellular or honeycomb-type structure generally indicated at 21 in which case different shapes are employed as shown to develop chamber 19 and perform in the same manner as the channel structure. Obviously, the form of the compartmented element may vary by taking many shapes, which may or may not include the side channels 13' as shown in Fig. 3, within the scope of the invention. The cellular structure of Fig. 3 may also be attached in any suitable manner to the rotating member such as disk 13.

Thus the present invention is a relatively simple arrangement that permits the use of light weight and thin stock without the disadvantages of the destructive centrifugal forces normally associated therewith. Consequently, the invention has suitable application in high speed rotating parts especially of the type that may be found in the aforementioned jet engine application where light weight is a factor of prime importance.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What we claim as new and desire to secure by Letters Patent is:

1. The combination with a rotating member within a stationary member of a pressure chamber between said members comprising, an outwardly facing compartmented element on said rotating member of an axial width greater than said rotating member and extending into close proximity to said stationary member to form said chamber therewith, fluid supply means in one of said members opening into said chamber to direct high pressure fluid into said chamber to pressurize said chamber and balance the centrifugal effect on said rotating member.

2. The combination with a rotating member within a stationary member of a pressure chamber between said members comprising, an outwardly facing thin sheet metal compartmented element on said rotating member of an axial width greater than said rotating member, a recessed portion in said stationary element, said compartmented element extending into said recessed portion into close proximity thereto to form said chamber between said stationary member and said compartmented element, fluid supply means in said stationary member opening into said chamber to direct high pressure fluid into said chamber to pressurize said chamber and balance the centrifugal effect on said rotating member.

3. The combination with a rotating member within a stationary member of a pressure chamber between said members comprising, a plurality of outwardly opening thin sheet metal nested channel-shaped elements on said rotating member of an axial width greater than said member, a recessed portion in said stationary element, said channel members extending into said recessed portion into close proximity thereto to form said chamber between said stationary member and said channels, fluid supply means in said stationary member opening into said chamber to direct high pressure fluid into said chamber to pressurize said chamber and balance the centrifugal effect on said rotating member.

4. The combination with a rotating shaft within a stationary housing of a pressure chamber between said shaft and housing comprising, a disk on said shaft, a plurality of outwardly opening thin sheet metal nested channel-shaped elements on the periphery of said disk of an axial width greater than said disk, a recessed portion in said housing radially outwardly of said channels, said channels extending into close proximity thereto to form said chamber between said housing and channels, air supply means in said housing to direct high pressure air into said chamber to pressurize said chamber and balance the centrifugal effect on said rotating disk.

5. The combination with a rotating shaft within a stationary housing of a pressure chamber between said shaft and housing comprising, a disk on said shaft blades on the periphery of said disk, a plurality of outwardly opening thin sheet metal nested channel elements on the periphery of said blades of an axial width greater than said disk, said channel elements extending around said blades in the peripheral direction, a recessed portion in the shape of an annulus in said housing radially outwardly of said channels, said channels extending into close proximity thereto to form said chamber between said housing and channels, air supply means in said housing to direct high pressure air into said chamber to pressurize said chamber and said annulus and balance the centrifugal effect on said rotating disk and blades.

6. The combination with a rotating member within a stationary member of a pressure chamber between said members comprising, an outwardly facing compartmented cellular element on said rotating member of an axial width greater than said rotating member, a recessed portion in said stationary element, said compartmented cellular element extending into said recessed portion into close proximity thereto to form said chamber between the stationary member and said compartmented cellular element, fluid supply means in said stationary member opening into said chamber to direct high pressure fluid into said chamber to pressurize said chamber and balance the centrifugal effect on said rotating member.

References Cited in the file of this patent

UNITED STATES PATENTS

| | | |
|---|---|---|
| 1,030,153 | Barbezat | June 18, 1912 |
| 1,122,051 | Wohlenberg | Dec. 22, 1914 |
| 1,871,662 | Carrier | Aug. 16, 1932 |
| 2,350,310 | Dahlstrand | May 30, 1944 |
| 2,393,116 | McCulloch et al. | Jan. 15, 1946 |
| 2,603,539 | Brewster | July 15, 1952 |
| 2,640,679 | Wheatley et al. | June 2, 1953 |
| 2,648,493 | Stalker | Aug. 11, 1953 |
| 2,666,624 | Flurschutz | Jan. 19, 1954 |
| 2,675,174 | McDowall et al. | Apr. 13, 1954 |
| 2,685,429 | Auyer | Aug. 3, 1954 |
| 2,702,157 | Stalker | Feb. 15, 1955 |

FOREIGN PATENTS

| | | |
|---|---|---|
| 15,154A | Great Britain | June 27, 1907 |
| 313,128 | Germany | June 25, 1919 |
| 407,012 | France | Dec. 20, 1909 |
| 411,201 | Great Britain | June 7, 1934 |
| 498,435 | Germany | May 22, 1930 |
| 549,038 | Great Britain | Nov. 3, 1942 |
| 552,021 | France | Jan. 16, 1923 |
| 668,434 | Great Britain | Mar. 19, 1952 |